US010663304B2

(12) United States Patent
Wege et al.

(10) Patent No.: US 10,663,304 B2
(45) Date of Patent: May 26, 2020

(54) METHOD AND APPARATUS FOR CREATING OR SUPPLEMENTING A MAP FOR A MOTOR VEHICLE (71) Applicant: VOLKSWAGEN AG, Wolfsburg (DE)

(72) Inventors: Andreas Wege, Berlin (DE); Stephan Max, Gifhorn (DE); Kristian Weiß, Berlin (DE); Sascha Bauer, Berlin (DE); Mehmet Eylem Kirlangic, Wolfsburg (DE); Robert Konnopka, Berlin (DE); Lars Krüger, Schorfheide (DE); Jesko Klandt, Berlin (DE); Christian Tendyck, Berlin (DE)

(73) Assignee: Volkswagen AG (DE)

( * ) Notice: Subject to any disclaimer, the term of this patent is extended or adjusted under 35 U.S.C. 154(b) by 48 days.

(21) Appl. No.: 15/672,875

(22) Filed: Aug. 9, 2017

(65) Prior Publication Data
US 2018/0045521 A1 Feb. 15, 2018

(30) Foreign Application Priority Data
Aug. 10, 2016 (DE) .......... 10 2016 214 868

(51) Int. Cl.
*G01C 21/32* (2006.01)
*G01C 21/20* (2006.01)
(Continued)

(52) U.S. Cl.
CPC .......... *G01C 21/32* (2013.01); *G01C 21/206* (2013.01); *G01C 21/3602* (2013.01);
(Continued)

(58) Field of Classification Search
CPC ..... G01C 21/30; G01C 21/32; G01C 21/3602
See application file for complete search history.

(56) References Cited

U.S. PATENT DOCUMENTS 4,811,199 A * 3/1989 Kuechler .......... G06F 17/30595
4,891,761 A * 1/1990 Gray ................ G01C 21/32
340/993

(Continued)

FOREIGN PATENT DOCUMENTS

CN 101046390 A 10/2007
CN 101726308 A 6/2010
(Continued)

OTHER PUBLICATIONS

Search Report for German Patent Application No. 10 2016 214 868.0; dated Apr. 7, 2017.
(Continued)

*Primary Examiner* — Hunter B Lonsberry
*Assistant Examiner* — Donald J Wallace
(74) *Attorney, Agent, or Firm* — Barnes & Thornburg LLP (57) ABSTRACT A method for creating or augmenting a map for a motor vehicle, wherein the motor vehicle establishes its location in a surrounding environment by comparing environment data acquired by at least one sensor with map data stored in the map. The method provides a base map of a surrounding environment of the motor vehicle; provides at least one base segment, wherein the at least one base segment has at least one characteristic feature; and creates or augments the map by generating map data, wherein the map data is generated by a map creation unit by assigning the at least one provided base segment to an associated position in the provided base map. Also disclosed is a corresponding device.

18 Claims, 8 Drawing Sheets

(51) Int. Cl.
*G01C 21/36* (2006.01)
*G05D 1/02* (2020.01)
*B60W 30/06* (2006.01)
(52) U.S. Cl.
CPC ........... *G05D 1/0274* (2013.01); *B60W 30/06* (2013.01); *G05D 2201/0213* (2013.01)

(56) References Cited

U.S. PATENT DOCUMENTS

| | | | | |
|---|---|---|---|---|
| 6,628,278 | B1* | 9/2003 | Ritter | G01C 21/3638 345/419 |
| 7,002,578 | B1* | 2/2006 | Ritter | G01C 21/3638 345/419 |
| 8,413,087 | B1* | 4/2013 | Rao | G06F 17/5031 716/105 |
| 9,761,204 | B1* | 9/2017 | Ginetti | G09G 5/363 |
| 2003/0125871 | A1* | 7/2003 | Cherveny | G01C 21/26 701/409 |
| 2007/0233380 | A1* | 10/2007 | Tanaka | G01C 21/3602 701/436 |
| 2008/0313563 | A1* | 12/2008 | Yun | G06F 17/5004 715/810 |
| 2010/0030459 | A1* | 2/2010 | Geelen | G01C 21/32 701/532 |
| 2011/0161032 | A1* | 6/2011 | Stahlin | G01C 21/30 702/94 |
| 2012/0310516 | A1* | 12/2012 | Zeng | G01C 21/32 701/300 |
| 2013/0046430 | A1* | 2/2013 | Bageshwar | G05D 1/0231 701/23 |
| 2013/0162824 | A1* | 6/2013 | Sung | G01C 21/3602 348/148 |
| 2015/0081211 | A1* | 3/2015 | Zeng | B60W 30/0956 701/446 |
| 2015/0227492 | A1* | 8/2015 | Bai | G06F 17/248 715/762 |
| 2015/0233720 | A1* | 8/2015 | Harada | G06K 9/00523 701/409 |
| 2015/0344028 | A1* | 12/2015 | Gieseke | B60W 30/00 701/1 |
| 2016/0161265 | A1* | 6/2016 | Bagheri | G01C 21/32 701/450 |
| 2016/0209846 | A1* | 7/2016 | Eustice | G05D 1/0246 |
| 2017/0010120 | A1* | 1/2017 | Shashua | G01C 21/32 |
| 2017/0284810 | A1* | 10/2017 | Altinger | G01C 21/206 |
| 2018/0024548 | A1* | 1/2018 | Mielenz | B60W 30/06 701/2 |

FOREIGN PATENT DOCUMENTS

| | | |
|---|---|---|
| CN | 101750060 A | 6/2010 |
| CN | 101847319 A | 9/2010 |
| CN | 101903745 A | 12/2010 |
| CN | 103268729 A | 8/2013 |
| CN | 103822637 A | 5/2014 |
| CN | 104865578 A | 8/2015 |
| CN | 104951567 A | 9/2015 |
| CN | 105674993 A | 6/2016 |
| DE | 19920709 A1 | 11/2000 |
| DE | 102007014674 A1 | 10/2007 |
| DE | 102010026840 A1 | 1/2012 |
| DE | 102014013208 B3 | 1/2016 |
| DE | 102014217849 A1 | 3/2016 |
| DE | 102014015073 A1 | 4/2016 |
| DE | 102015202471 A1 | 8/2016 |
| EP | 0921509 A2 | 6/1999 |

OTHER PUBLICATIONS

Office Action for Chinese Patent Application No. 201710679923.8; dated Oct. 21, 2019.

* cited by examiner

METHOD AND APPARATUS FOR CREATING OR SUPPLEMENTING A MAP FOR A MOTOR VEHICLE

PRIORITY CLAIM

This patent application claims priority to German Patent Application No. 10 2016 214 868.0, filed 10 Aug. 2016, the disclosure of which is incorporated herein by reference in its entirety.

SUMMARY

Illustrative embodiments relate to a method and to a device for creating or augmenting a map for a motor vehicle, wherein the motor vehicle establishes its location in the surrounding environment by comparing environment data acquired by at least one sensor with map data stored in the map.

BRIEF DESCRIPTION OF THE DRAWINGS

The disclosed embodiments are described in greater detail below with reference to the figures, in which.

DETAILED DESCRIPTION

Modern motor vehicles are equipped with a multiplicity of assistance systems, which assist the driver when driving the motor vehicle. Besides lane-keeping assist and cruise-control systems, it is also possible to perform automated journeys in which the driver no longer needs to drive the vehicle manually.

To perform an automated journey of this kind, the motor vehicle must be able to establish its exact location in a surrounding environment. To do this, the motor vehicle uses a sensor to detect its surrounding environment and recognizes features in the environment data acquired by the sensor. The motor vehicle then establishes its location in a map on the basis of the recognized features.

DE 10 2014 015 073 A1 discloses a method for updating and/or enhancing a map dataset for a bounded environment, in particular a parking environment, within which mobile devices travel that comprise surround sensors, wherein a current map dataset is transmitted to a mobile device being operated within the environment, and is used inside the device to localize the mobile device within the environment, wherein feature data describing at least one property of at least one feature in the environment, which property does not yet exist in the map dataset or exists differently therein, is determined from sensor data from the surround sensors of the mobile devices and saved in the copy of the map dataset stored in the mobile devices, whereupon the map datasets enhanced in this manner are transmitted to a central server installation associated with the environment, and merged there into an updated map dataset, taking into account the new and/or altered properties.

The disclosed embodiments address the technical problem of providing a method and a device for creating or augmenting a map for a motor vehicle, wherein the creation or augmentation of the map is improved.

A method for creating or augmenting a map for a motor vehicle is provided, wherein the motor vehicle establishes its location in a surrounding environment by comparing environment data acquired by at least one sensor with map data stored in the map, which method comprises the following operations: providing a base map of a surrounding environment of the motor vehicle; providing at least one base segment, wherein the at least one base segment has at least one characteristic feature; creating or augmenting the map by generating map data, wherein the map data is generated by a map creation unit by assigning the at least one provided base segment to an associated position in the provided base map.

In addition, a device for creating or augmenting a map for a motor vehicle is created, wherein the motor vehicle establishes its location in a surrounding environment by comparing environment data acquired by at least one sensor with map data stored in the map, which device comprises: a controller for processing a provided base map of a surrounding environment of the motor vehicle and for processing at least one provided base segment, wherein the at least one base segment has at least one characteristic feature; a map creation unit, the map creation unit being designed to create or augment the map by generating map data, wherein the map data is generated by assigning the at least one provided base segment to an associated position in the provided base map.

The central idea of the disclosed embodiments is to improve the creation or augmenting of a map by providing a base map and a base segment. Map data is then generated from the base map and the base segments, and is entered into a map. In this context, the base segments represent characteristic elements or components in the region to be created or augmented of the surrounding environment of the motor vehicle or of the map, from which elements the map can be compiled. Base segments may be, for example, objects having similar or identical properties that repeat in the surrounding environment of the motor vehicle, for instance, pillars in an indoor car park that appear practically identical or a row of street lights of identical design. At least one characteristic feature for a base segment can then be derived from the objects. Examples of the characteristic feature may be a shape or a color of the object. The base map then comprises merely a reduced volume of data and hence constitutes a reduced form of the map. The base map comprises at least one position of a base segment. On the basis of the reduced volume of data and the provided base segments, it is then possible to generate a corresponding extract from the map by arranging the base segments at positions corresponding thereto that are stored in the base map. The map data, which is used to create or augment the map, is then obtained from the base map that has been enhanced by the base segments. The motor vehicle can then use the generated or augmented map to establish its location in the surrounding environment by comparing the map data stored in the map with environment data acquired by a sensor.

In the disclosed embodiments, only a reduced volume of data needs to be processed and/or transmitted when map data is meant to be exchanged, for instance, between a stationary device and a motor vehicle or between a plurality of motor vehicles. In addition, where different surrounding environments of the motor vehicle are very similar but a complete map does not exist for these environments, the method and the device allow existing knowledge to be applied to other environments. For instance, a map may be known for a single parking level of a car park. The map then consists of the base map and the base segments. Base segments may be, for example, repeating features or objects in an indoor car park, such as pillars, parking-space markings or markings on the roadway. It is then possible to generate map data for the remaining parking levels from the already known base segments or a known set of base segments and a provided base map, with the result that a map can also be created for these unknown regions.

Base segments can consist of parts of the surrounding environment that are similar or identical to one another. Base segments can be repeating objects, for instance, pillars in an indoor car park, street lights, curbstones, roadwork sections, individual houses in a terrace, reflector posts and crash barriers along roads, road markings, windows and entrances to buildings, lane panels, parking-space markings, etc.

Base segments can also be embodied such that they are not perceived, or not immediately perceived, as a physical object by a person, but have merely abstract features or patterns which can only be detected by sensor technology and recognized, interpreted and/or processed by a machine or a computer. So, for instance, it may be the case that patterns and features in an environment that are repetitive but which the human senses and/or the workings of the human mind cannot grasp can be recognized by a computer using a pattern recognition algorithm.

It can also be provided that the base map or parts of the base map are derived from building plans of a building, for instance, of an indoor car park, or of a district. This is done by analyzing the building plans and recognizing and classifying base segments in the building plans. Then, for example, if building plans are available for all the parking levels of an indoor car park but a map is available only for one of the parking levels, then each of the building plans can be used to generate a base map for the unmapped parking levels. The generated base maps can then be populated with base segments (e.g., parking-space markings, pillars, etc.) known from the mapped parking level. Map data can thereby be provided also for the unmapped parking levels.

It is provided in at least one disclosed embodiment that the at least one base segment can be parameterized in terms of the at least one characteristic feature. This makes it possible to change properties of the base segment when the map data is generated to adapt these properties to meet certain specifications or requirements.

Another disclosed embodiment provides that the assignment includes parameterizing the at least one base segment on the basis of parameters stored in the base map for the position associated with the at least one base segment. This allows accurate matching of a base segment to a region to be mapped in the surrounding environment of the motor vehicle from parameters stored in the base map. Thus, for instance, a pillar in an indoor car park can be adapted accordingly to meet specifications.

At least one disclosed embodiment provides that the parameterizing involves defining at least one dimension and/or a surface finish of the at least one base segment.

The dimension may comprise, for instance, a length, a width or a depth of the at least one base segment. In addition, however, it is also possible to scale all of these quantities. If a base segment is a pillar in an indoor car park, for example, then a length, a width and/or a depth of the pillar can be specified. It is thereby possible, for example, to take into account a lower floor height in an indoor car park without having to modify the base segment itself. For instance, if the 5th floor of the indoor car park is designed to be lower in height than the other floors, then the base element for a pillar is adapted accordingly in terms of its height. The value for the height of the pillars that is provided for the 5th floor is then stored as a parameter at the position of the associated base segments.

A surface finish may be a texture of the surface, for example, as is known from the field of computer graphics. A color or a pattern on a surface of a base segment can be adapted, for example. Thus, for instance, for pillars in an indoor car park which are otherwise identical in design, the brightness of the texture can be adapted as a result of poor light conditions. Another adaptation may be specifying a color of the surface of a base segment, for example. For instance, it is common in many indoor car parks to use different colors to identify different floor levels so that a car park user can remember more easily the floor level on which he has parked his motor vehicle. If, for example, the 4th floor level is red in design, whereas the 5th floor level is yellow, then base segments for the pillars on the 4th floor level are given a red surface, while the pillars on the 5th floor level are given a yellow surface. The associated parameters are stored in the base map at the positions of the pillars.

According to another disclosed embodiment, providing the base map and/or providing the at least one base segment involves receiving by a receiver at least some of the base map and/or the at least one base segment from a server outside the motor vehicle. For instance, a motor vehicle that drives into an unknown indoor car park can receive a base map and associated base segments from a server of the indoor car park. Then the map creation unit generates map data in the motor vehicle on the basis of the received base map and the received base segments. This is done by forming the relevant base segments at the positions intended for the base segments in the base map, thereby "populating" the base map with base segments. Once all the base segments have been formed and, if intended, parameterized, then a map is available for the surrounding environment of the motor vehicle, in which map the motor vehicle can then establish its location.

Transmitting the map as a base map and at least one base segment allows a reduction of the data volume that has to be transmitted.

The base map and the base segments can be transmitted and received, for example, via a wireless network connection, for instance, via a W-LAN or a mobile communications service.

According to at least one disclosed embodiment, providing the base map and/or providing the at least one base segment involves retrieving at least some of the base map and/or the at least one base segment from a memory. The base map and/or the base segment can have been stored in the memory at an earlier point in time, for example. Storing base map and base segments in the memory is beneficial, for example, with regard to an amount of memory space required, because less memory is needed.

In addition, at least one disclosed embodiment provides that a base-segment generator uses environment data acquired by the at least one sensor to generate and provide at least one base segment. The base-segment generator may likewise be arranged in the motor vehicle, for example. Then on the basis of the environment data acquired by the at least one sensor, the base-segment generator seeks, recognizes and/or classifies similar or identical objects in the environment data, i.e., in the surrounding environment. The base-segment generator uses pattern recognition techniques, for instance, to do this, which scan the environment data for repeating similar or identical patterns and/or for the at least one characteristic feature. If similar patterns and/or characteristics features are detected, then the positions of the associated objects are found and the patterns aggregated into a base segment. If the base-segment generator finds a pattern in the environment data, for example, for instance, in an image captured by a camera, which pattern matches that of repeating pillars in an indoor car park, then a base segment is generated for the corresponding pattern. In addition, parameters belonging to the at least one characteristic feature are defined for the individual pillars. These may be, for example, dimensions or surface finishes for each of the individual pillars.

At least one disclosed embodiment correspondingly provides that a base-map generator uses environment data acquired by the at least one sensor to generate and provide at least some of the base map. The positions of the recognized individual instances of a base segment are determined in a similar way to the identification of base segments. These positions are then stored in the base map with an associated identifier that labels the corresponding base segment. The parameters defined in association with a base segment for producing therefrom actual embodiments of objects, for instance, parameters such as dimensions or a surface finish, are likewise stored at the relevant position in the base map.

It is also provided in at least one disclosed embodiment that at least part of the created or augmented map is transmitted by a transmitter to a server outside the motor vehicle. In the example mentioned above, in which a motor vehicle drives into an unknown indoor car park and receives a base map and base segments transmitted from a server of the indoor car park, this means, for example, that the motor vehicle uses a device described above to generate a map from the received base map and the received base segments, and transmits this generated map, or a part thereof, back to the server of the indoor car park. Map data or a created or augmented map for the relevant surrounding environment is then available to the server of the indoor car park.

The following scenarios can thereby be realized, for instance, where the choice of an indoor car park is merely by way of example and has no limiting effect on the field of use of the disclosure.

A server in an indoor car park or in another facility transmits a base map and associated base segments to a device in a motor vehicle. The map data is then generated therefrom in the motor vehicle.

A device is arranged in an indoor car park. Both a base map and base segments are stored in a memory. Then in the indoor car park, map data is generated for a map of the indoor car park, for example, for all parking levels. The generated map data or the map can then be transmitted in full to a motor vehicle.

A device having a base-segment generator and a base-map generator is arranged in a motor vehicle. Then during a drive through an indoor car park, base segments and a base map of the indoor car park or parts thereof are generated. Then map data generated therefrom and/or the base segments and/or the base map can be transmitted to an external device, for instance, to a server of the indoor car park.

The method described can be used easily to generate and/or augment a map. In this process it is also possible to incorporate in the map current modifications in the surrounding environment. Thus, for example, in a drive through an indoor car-park level it is possible to establish that new base segments exist that are missing from a provided set of base segments and/or from a provided base map. This may be, for example, a pothole in the road surface resulting from weather conditions. Such a pothole can then be recognized by the base-segment generator and a corresponding (new) base segment generated for this. The generated base segment is then transmitted to a central server, for instance, to a server of the indoor car park, together with a corresponding position in a base map. The new base segment and the extract of the base map in which the position of the new base segment is stored are then inserted by the server into the existing set of base segments, and the position of the new base segment is stored accordingly in the existing base map.

Parts of the device can be embodied individually or jointly as a combination of hardware and software, for instance, as program code that is executed on a microcontroller or microprocessor.

Figure 1:
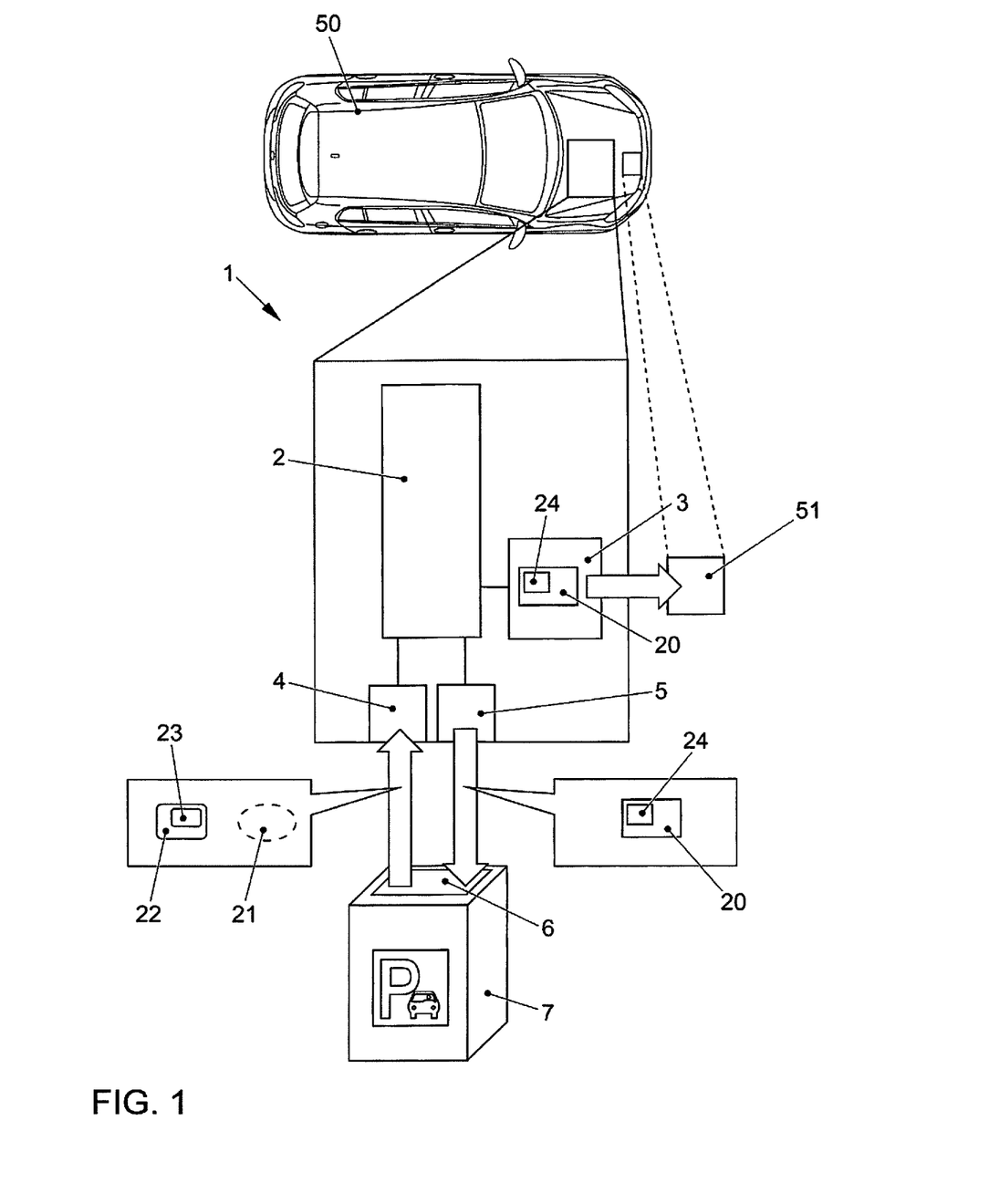
FIG. 1 is a schematic diagram of an embodiment of a device for creating or augmenting a map for a motor vehicle, wherein the device is arranged in the motor vehicle.

FIG. 1 is a schematic diagram of a disclosed embodiment of a device 1 for creating or augmenting a map 20 for a motor vehicle 50. In this disclosed embodiment, the device 1 is arranged in the motor vehicle 50. The device 1 comprises a controller 2, a map creation unit 3, a receiver 4 and a transmitter 5. In the embodiment shown, a base map 21 and at least one base segment 22, which has at least one characteristic feature 23, are provided by a server 6 arranged in an indoor car park 7. The provided base map 21 and the provided at least one base segment 22 are transmitted to the motor vehicle 50 and received there by the receiver 4. The received base map 21 and the received at least one base segment 22 are forwarded by the receiver 4 to the controller 2, which forwards the base map and base segment to the map creation unit 3. The map creation unit 3 creates or augments the map 20 by generating map data 24, the map data 24 being generated by assigning the at least one provided and received base segment 22 to an associated position in the provided and received base map 21.

It can also be provided when generating the map data that the assignment includes parameterizing the at least one base segment 22 on the basis of parameters stored in the base map 21 for the position associated with the at least one base segment 22. One such parameter may be, for instance, a dimension of the base segment 22 or a surface finish of the at least one base segment 22. The parameterizing allows a base segment 22, which is basically generic in design, to be adapted to match a surrounding environment that actually exists. One or more dimensions and a surface finish, for instance, a surface texture or a color, can thereby be adapted.

The map data 24 generated in this way or the map 20 can then be provided to a device of the motor vehicle 50. The device may be, for example, a localization device 51 that is designed to localize the motor vehicle 50 in the surrounding environment by comparing environment data acquired by at least one sensor with map data 24 stored in the map 20.

It can also be provided that the generated map data 24 or the generated map 20 is transmitted back to the server 6 of the indoor car park 7 via the transmitter 5. The map data 24 or the map 20 can thereby be provided to the indoor car park 7 and hence to other motor vehicles.

Figure 2:
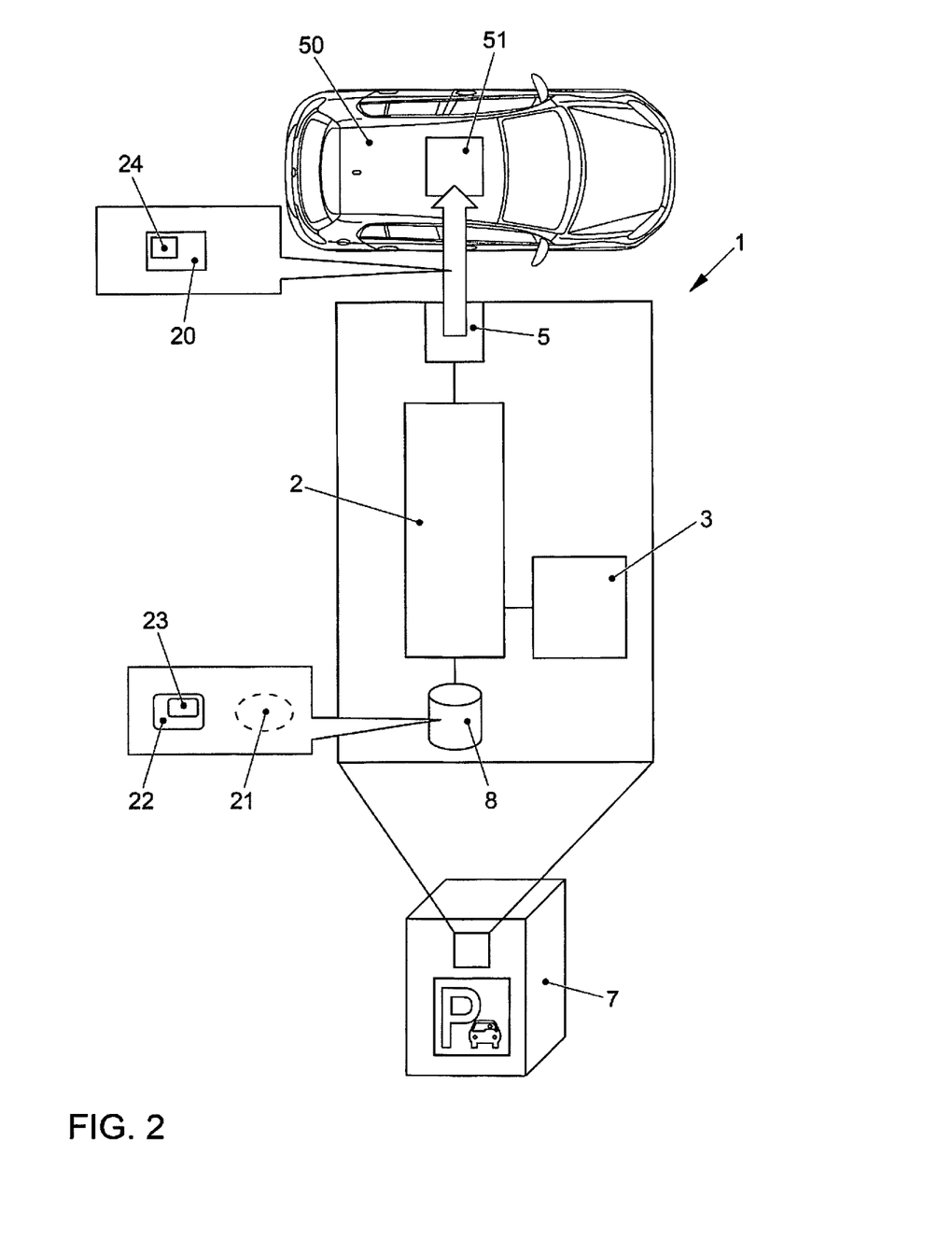
FIG. 2 is a schematic diagram of an embodiment of a device for creating or augmenting a map for a motor vehicle, wherein the device is arranged in an indoor car park.

FIG. 2 shows a schematic diagram of another disclosed embodiment of a device 1 for creating or augmenting a map 20 for a motor vehicle 50. In this disclosed embodiment, the device 1 is arranged in an indoor car park 7. The device 1 comprises a controller 2, a map creation unit 3, a transmitter 5 and a memory 8. In the memory are stored a base map 21 and at least one base segment 22, which has at least one characteristic feature 23. The controller 2 provides the base map 21 and the at least one base segment 22 to the map creation unit 3 by retrieving the base map 21 and the at least one base segment 22 from the memory 8. The map creation unit 3 generates map data 24 on the basis of the provided base map 21 and the provided at least one base segment 22, the map data 24 being generated by assigning the at least one provided base segment 22 to an associated position in the provided base map 21. The generated map data 24 or the generated or augmented map 20 are then transmitted to the motor vehicle 50 via the transmitter 5. In the motor vehicle, a localization device 51, for example, can localize the motor vehicle 50 in a surrounding environment on the basis of the transmitted map data 24 or the transmitted map 20. In this disclosed embodiment, only a very small volume of data needs to be held in the memory 8 even though detailed map data 24 can be provided.

Figure 3:
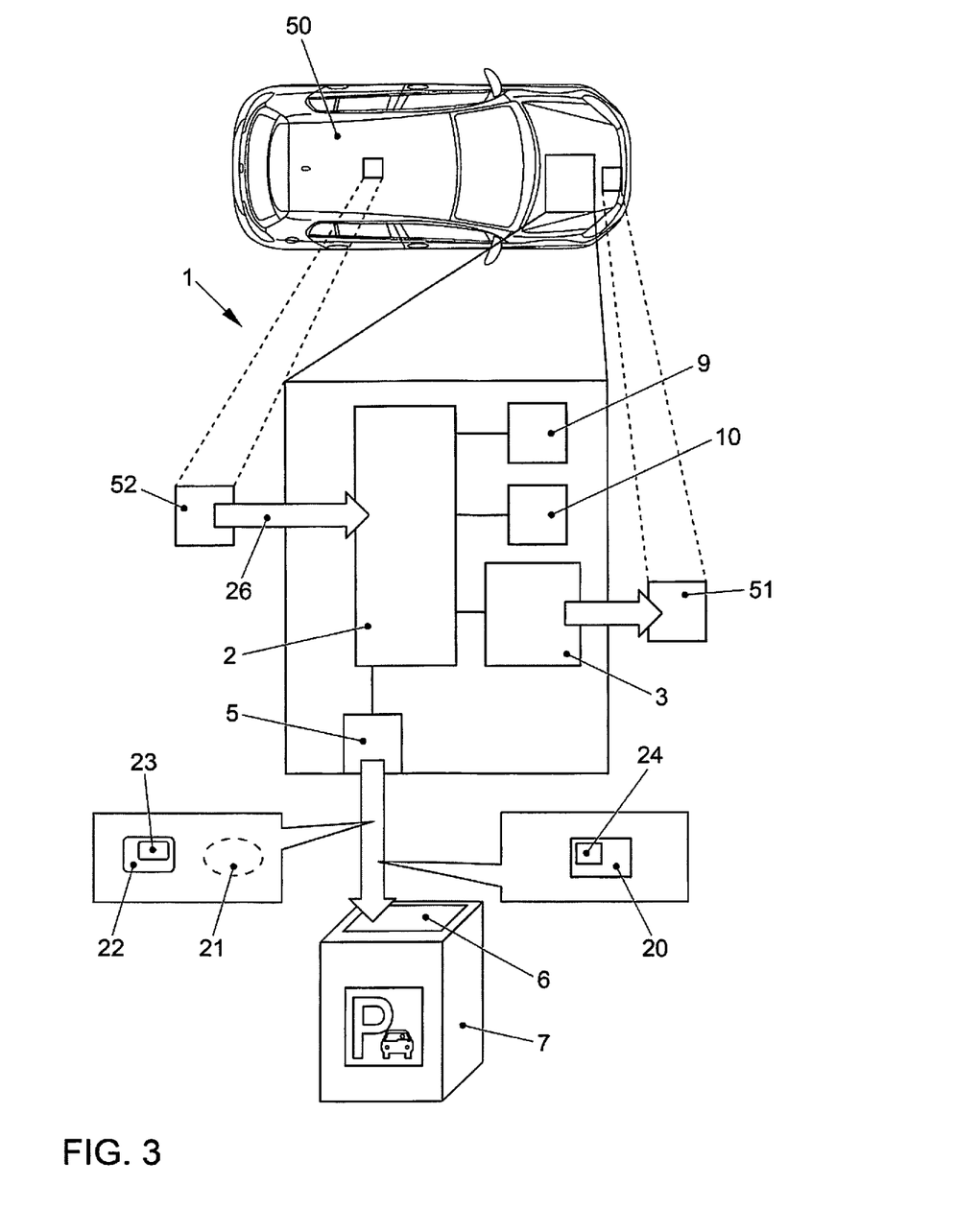
FIG. 3 is a schematic diagram of an embodiment of a device for creating or augmenting a map for a motor vehicle, wherein the device is arranged in a motor vehicle.

FIG. 3 shows a schematic diagram of another disclosed embodiment of a device 1 for creating or augmenting a map 20 for a motor vehicle 50, the device 1 being arranged in a motor vehicle 50. The device 1 comprises a controller 2, a map creation unit 3, a transmitter 5, a base-segment generator 9 and a base-map generator 10. During a drive through an indoor car park 7, at least one sensor 52 arranged in the motor vehicle 50 detects a surrounding environment of the motor vehicle and provides the controller 2 with acquired environment data 26. The controller 2 supplies the environment data 26 to the base-segment generator 9 and the base-map generator 10. The base-segment generator 9 generates at least one base segment 22 on the basis of the provided environment data 26. Pattern and feature recognition techniques can be used for this purpose, for example, to recognize and classify patterns and/or features in the environment data 26 acquired by the at least one sensor 52. In addition, the base-map generator 10 generates from the environment data 26 acquired by the at least one sensor 52 at least part of the base map 21. Pattern recognition techniques can again be used in this case to recognize and classify features and patterns in the provided environment data 26. The base-map generator 10 stores in the generated base map 21 positions of the at least one base segment 22. Such a position 25 (see FIG. 5*a*) can be determined, for instance, by triangulation or another positioning technique.

The generated base map 21 and the generated at least one base segment 22 can then be provided to the map creation unit 3, for example, which generates map data 24 or a map 20 from the base map 21 and the at least one base segment, as already described. The generated map data 24 or the generated map 20 can then be provided to another device of the motor vehicle 50, for instance, to a localization device 51 that performs localization of the motor vehicle in the surrounding environment on the basis of the provided map data 24 or the provided map 20.

It is provided that the generated base map 21 and the generated at least one base segment 22 are transmitted to a server 6 of the indoor car park 7 via the transmitter 5. The generated base map 21 and the generated at least one base segment 22 are thereby available to the indoor car park 7, with the result that the generated base map 21 and the at least one generated base segment 22 can be provided to other motor vehicles.

The base segments 22 described in FIG. 1 to FIG. 3 may be, for instance, pillars in an indoor car park, street lights, curbstones, roadwork sections, individual houses in a terrace, reflector posts and crash barriers along roads, road markings, windows and entrances to buildings, lane panels, parking-space markings, etc. The base segments 22 constitute objects in a surrounding environment of the motor vehicle 50 that are alike in their fundamental properties.

It can also be provided that the base-segment generator 9 is designed to determine at least one parameter on the basis of the at least one characteristic feature 23 of the base segment 22, which parameter can be used to parameterize the at least one base segment. The parameter may be, for instance, a height, a width or a length of the base segment 22. Similarly, the parameter may likewise describe a surface finish of the base segment 22. This may be, for instance, a surface texture or a color of the base segment 22. When the map creation unit 3 subsequently generates the map data 24, these parameters can then be parameterized accordingly, for instance, by adapting the dimensions of the base segment 22 to match the object in the actual surrounding environment. The parameters or the parameterization are stored for this purpose in the base map 21 at the positions corresponding to the base segments 22.

Figure 4:
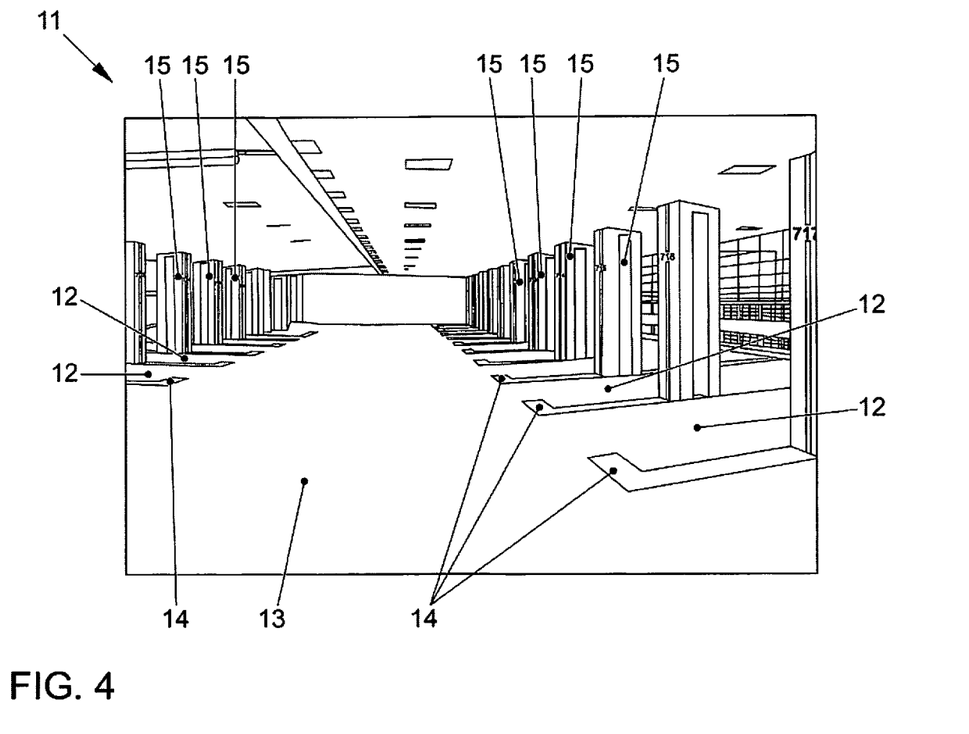
FIG. 4 is a schematic diagram of a typical environment in an indoor car park.

To clarify the disclosure, FIG. 4 shows a schematic diagram of a typical environment 11 in an indoor car park. This diagram shows a scene such as a camera pointing forwards in a motor vehicle would capture, for example. It shows a parking floor containing a plurality of parking spaces 12 on the right-hand side and left-hand side of a roadway 13. To keep the picture clear, separate reference numbers have not been assigned to all the objects shown in the diagram. A parking-space marking 14 and a pillar 15 are located at each of the parking spaces 12. Since the parking-space markings 14 and the pillars 15 have similar properties, they constitute objects that can be reduced or standardized or aggregated into base segments. In this case, characteristic features that can be derived for a corresponding base segment from the parking-space marking 14 are, for example, that at each of the parking spaces 12 they have the shape of an "L" and a white color. Characteristic features that can be derived from the pillars 15 are, for example, that they all have the same shape and the color black. A base-segment generator 9 now recognizes in the acquired environment data for the surrounding environment 11 the characteristic features of the parking spaces 12 and of the pillars 15, and uses pattern recognition techniques to extract therefrom the associated base segments for the parking-space markings 14 and the pillars 15. The base generator determines for each of the base segments, i.e., in this case for the individual parking-place markings 14 and for the individual pillars 15, associated positions, which are stored in a base map.

Figure 5A:
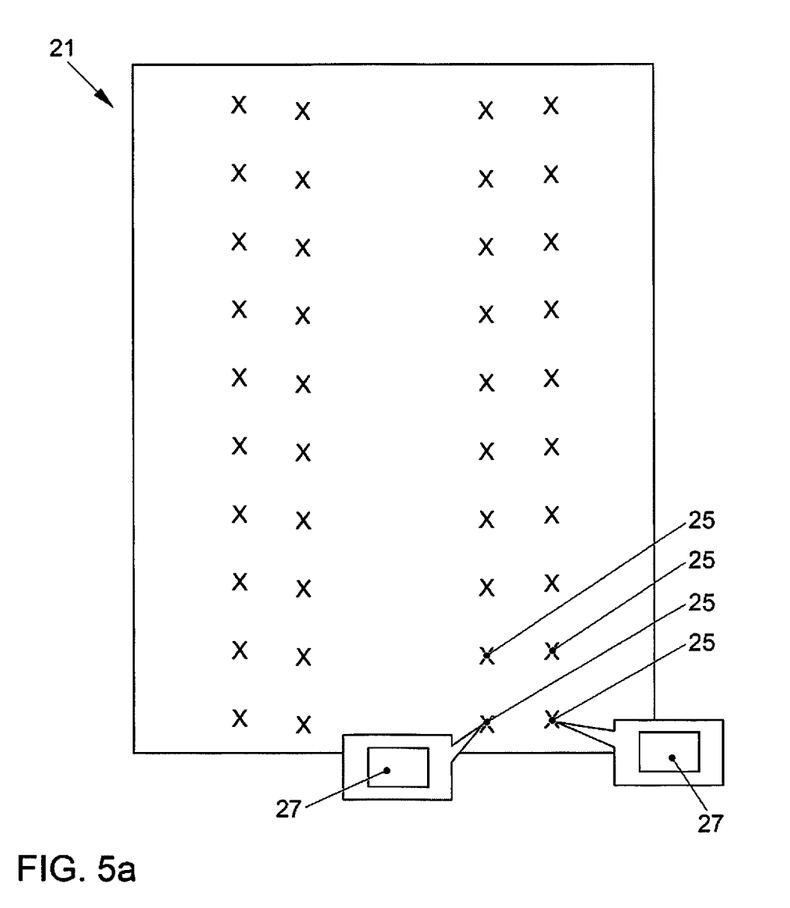
FIG. 5a is a schematic diagram of a base map containing positions of base segments, wherein the base map corresponding to the environment shown in FIG. 4.
Figure 5B:
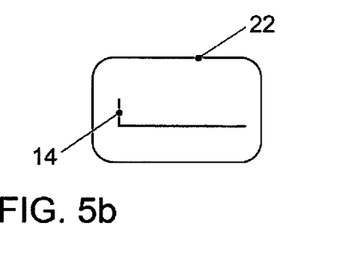
FIG. 5b is a schematic diagram of a base segment for a parking-space marking in an indoor car park.
Figure 5C:
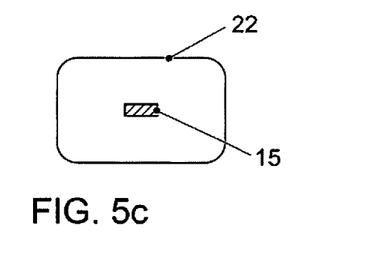
FIG. 5c is a schematic diagram of another base segment for a pillar in an indoor car park.

FIG. 5*a* shows a schematic diagram of a base map 21 containing positions 25 of base segments 22. The base map 21 in this figure corresponds to the schematic diagram shown in FIG. 4 of the typical environment 11 in the indoor car park. Thus the positions 25 represent the positions 25 of the parking-space markings 14 and of the pillars 15. For the sake of clarity, once again separate reference numbers have not been assigned to all the positions 25 in this diagram. In addition, parameters 27 of the associated base segments 22 can be assigned to the individual positions 25, which parameters are provided for the corresponding positions 25 during subsequent parameterizing of the base segments 22 in the base map 21. FIG. 5b and FIG. 5c show a base segment 22 for a parking-space marking 14 and a pillar 15 respectively, corresponding to the base map 21 shown in FIG. 5a.

As part of the process of generating the map data by the map creation unit, the base segments 22 shown in FIG. 5b and FIG. 5c are assigned to the individual associated positions 25 in the base map 21 shown in FIG. 5a. The base segments 22 can be identified, for example, by a unique identifier, for instance, an index. The base segments 22 can also be parameterized when the base segments 22 are assigned or allocated to the individual positions 25. For this purpose, the parameters 27 stored in the base map 21 for the individual positions 25 are retrieved and the base segment 22 parameterized accordingly.

Figure 6:
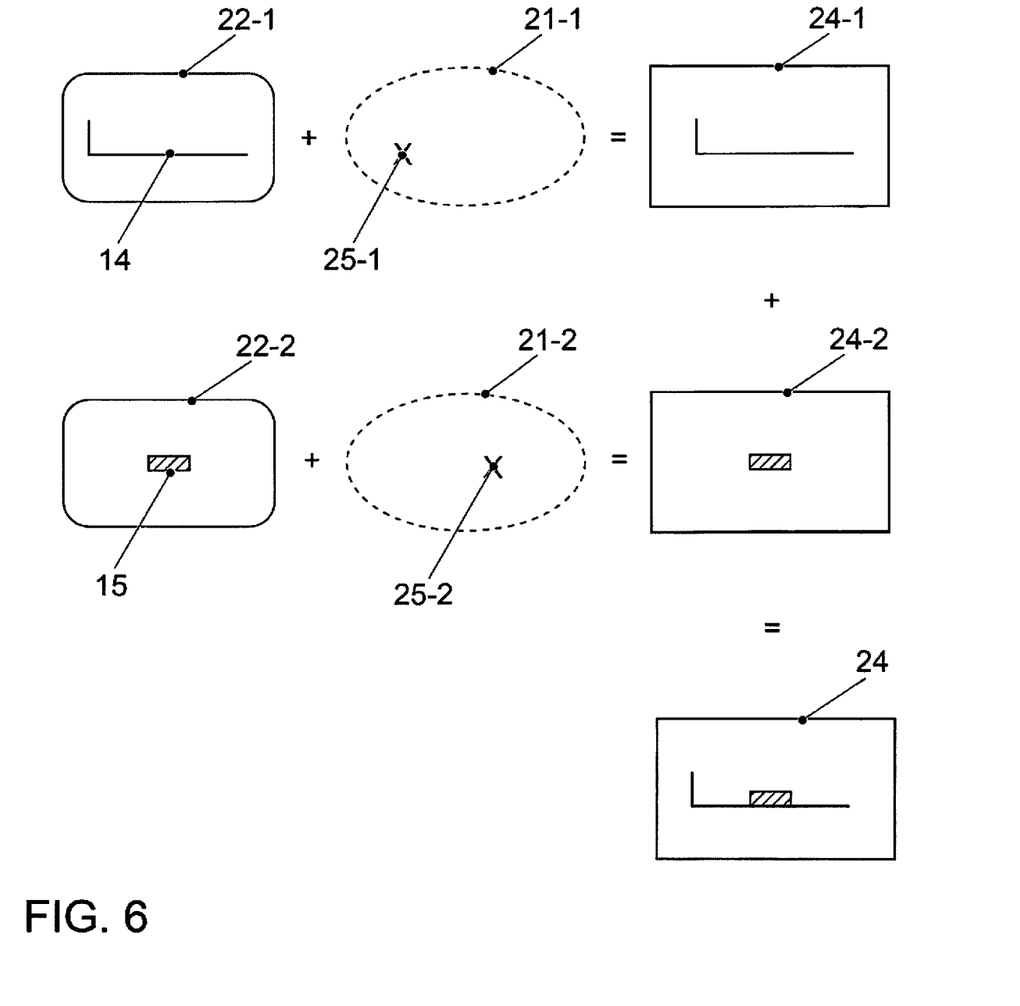
FIG. 6 is a schematic diagram for explaining the generation of map data from base segments and a base map.
Figure 7:
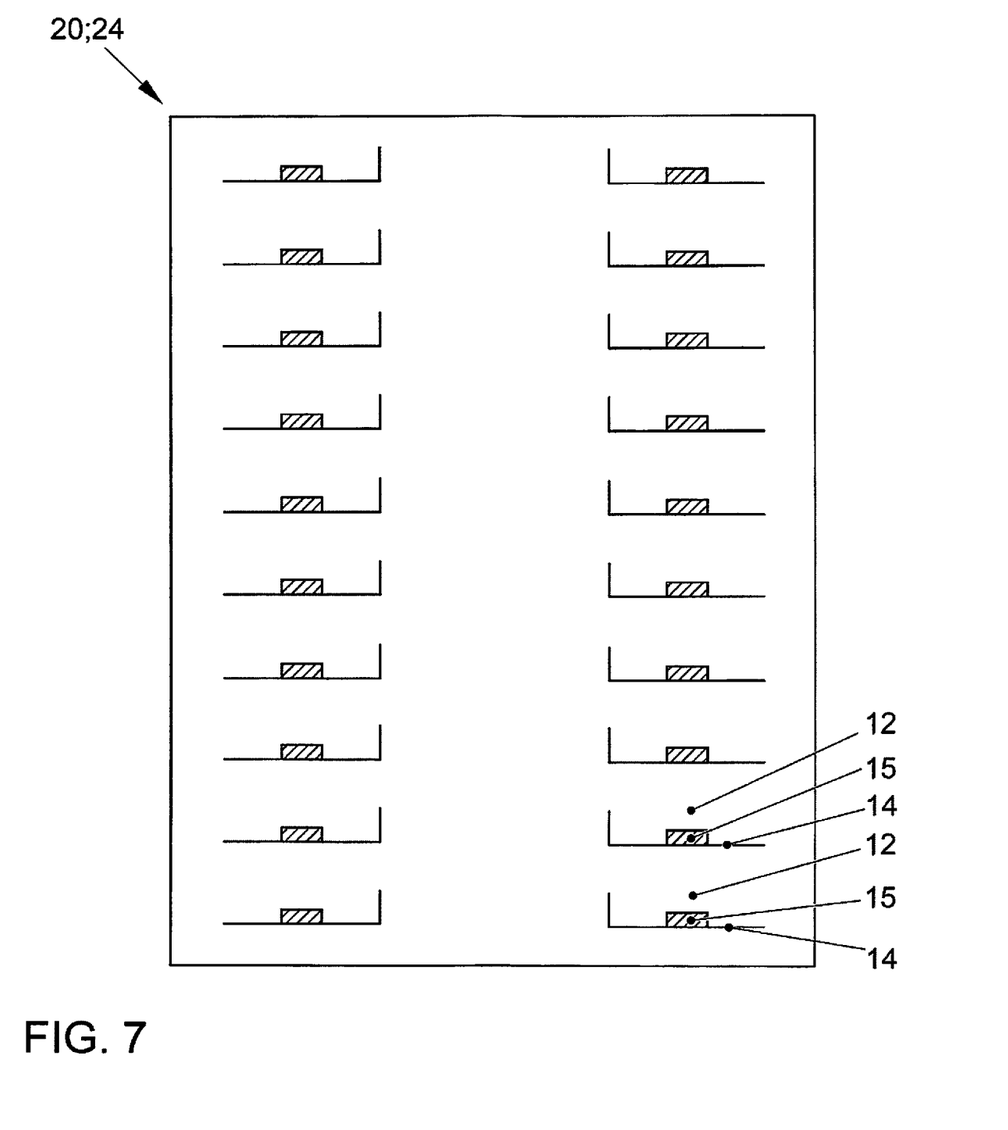
FIG. 7 is a schematic diagram of an extract of a map containing generated map data.

FIG. 6 shows a schematic diagram for explaining the generation of map data 24-1, 24-2 respectively from a base segment 22-1, 22-2 and a base map 21-1, 21-2. The base segment 22-1 for the parking-space marking 14 is stored at the associated position 25-1 in the base map 21-1, resulting in the generation of map data 24-1. Correspondingly, the base segment 22-2 for the pillar 15 is stored at the associated position 25-2 in the base map 21-2, resulting in the generation of the map data 24-2. Merging the map data 24-1, 24-2 produces the complete map data 24.

FIG. 6 shows map data 24 created in this way, or an extract from a map 20 created or augmented in this way, for the scene shown in FIG. 4. The individual base segments have now been parameterized and assigned to the individual associated positions in the base map. Both a parking-space marking 14 and a pillar 15 are now located at each of the parking spaces 12. Once again for the sake of clarity, corresponding reference numbers for the parking-space markings 14 and the pillar 15 have not been assigned to each of the parking spaces 12.

Figure 8:
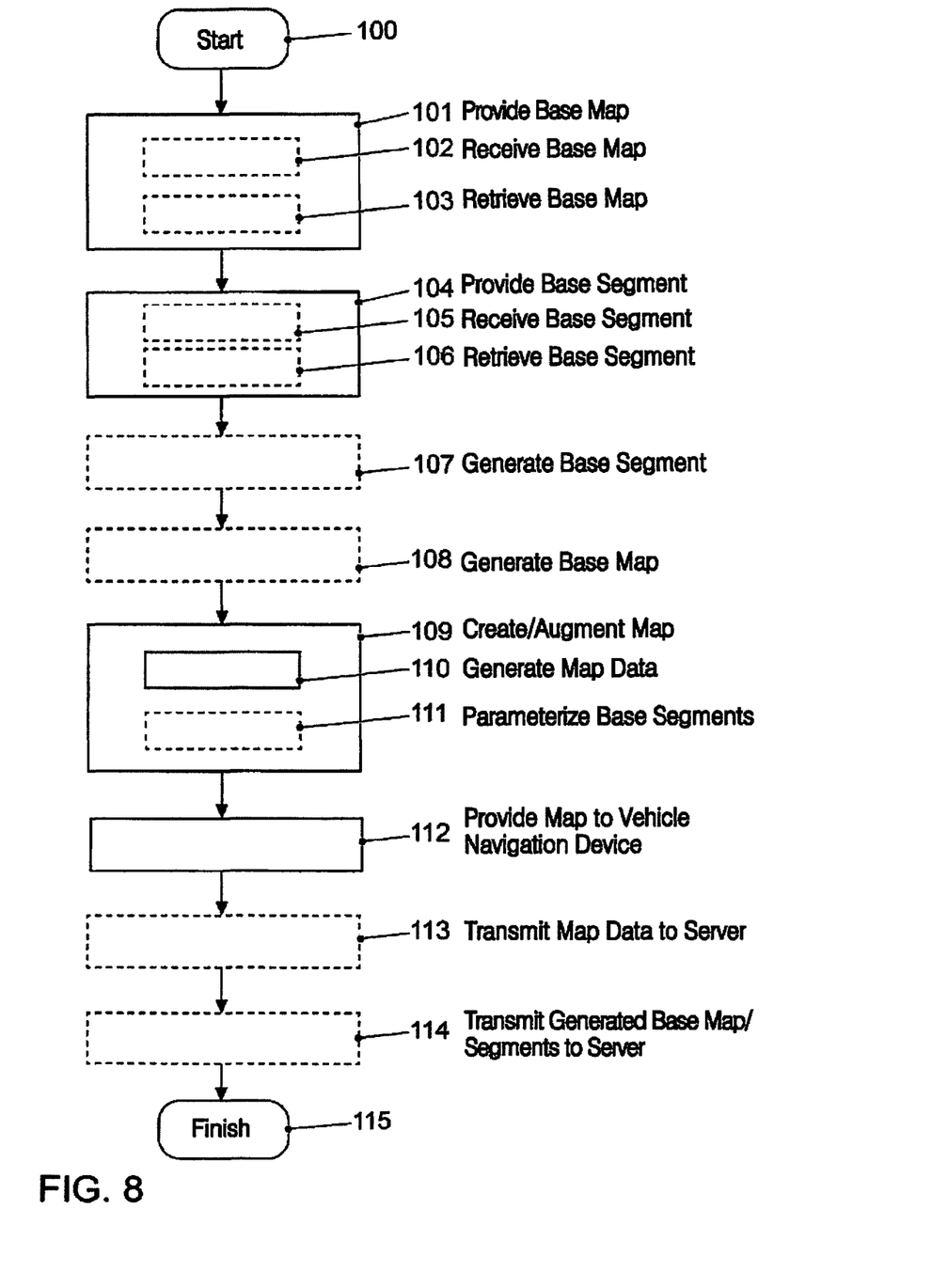
FIG. 8 is a schematic flow diagram of a method for creating or augmenting a map for a motor vehicle.

FIG. 8 shows a schematic flow diagram of a method for creating or augmenting a map for a motor vehicle. After the start 100 of the method, a base map is provided in a first method operation at 101. In method operation at 102, the base map can be provided, for example, by receiving at least some of the base map from a server outside the motor vehicle via a receiver. Alternatively in method operation at 103, the base map can also be provided by retrieving at least some of the base map from a memory.

In the subsequent method operation at 104, at least one base segment is provided. Once again, in method operation at 105, the at least one base segment can be provided by receiving at least one base segment from a server outside the motor vehicle via the receiver.

Alternatively, in method operation at 106, the base segment can be provided by retrieving the at least one base segment from the memory. As an alternative to method operations at 101 and 104, in method operation at 107, the at least one base segment can also be generated by a base-segment generator, which may be arranged in the motor vehicle, for example. In a similar manner and as an alternative to receiving or retrieving the base map, in method operation at 108, the base map can also be generated by a base-map generator. For this purpose, the base-map generator may be arranged in the motor vehicle, for example.

In method operation at 109, a map creation unit creates or augments a map on the basis of the provided base map and the provided at least one base segment, or on the basis of the generated base segment and/or the generated base map. To do this, the map creation unit generates map data in method operation at 110, the map data being generated by assigning the at least one provided base segment to an associated position in the provided base map. In addition to assigning the base segments to the corresponding positions in the base map, the individual base segments can also be parameterized in method operation at 111. For this purpose, the parameters stored in the base map at the associated positions for the base segments are retrieved, and the base segments are parameterized on the basis of the retrieved parameters at the respective positions.

The created or augmented map or the generated map data is provided, for example, to a navigation device or localization device of the motor vehicle at 112. The navigation device or the localization device then localizes the motor vehicle in a surrounding environment on the basis of the created or augmented map or the provided map data.

In addition, in an optional method operation at 113, it can be provided that the generated map data is transmitted to a server outside the motor vehicle.

In addition, in the method operation at 114, it is optionally provided that if base segments have been generated by the base-segment generator and a base map has been generated by a base-map generator, then these are transmitted to a server outside the motor vehicle. The method then finishes 115.

LIST OF REFERENCES 1 device
2 controller
3 map creation unit
4 receiver
5 transmitter
6 server
7 indoor car park
8 memory
9 base-segment generator
10 base-map generator
11 surrounding environment
12 parking space
13 roadway
14 parking-space marking
15 pillar
20 map
21 base map
21-1 base map
21-2 base map
22 base segment
22-1 base segment
22-2 base segment
23 characteristic feature
24 map data
24-1 map data
24-2 map data
25 position
25-1 position
25-2 position
26 environment data
27 parameter
50 motor vehicle
51 localization device
52 sensor
100-115 method operations

The invention claimed is:

1. A method for creating an augmented map for use within a transportation vehicle, the method comprising:

providing a base map of a surrounding environment of the transportation vehicle, wherein the providing the base map includes receiving, by a receiver included in the transportation vehicle, at least some of the base map from a server located outside the transportation vehicle that is associated with the surrounding environment;

providing at least one base segment that has at least one characteristic feature and is indicative of each of a plurality of objects having similar or identical characteristic features and repeating in the surrounding environment of the transportation vehicle, wherein the providing the at least one base segment includes receiving, by the receiver, at least one base segment from the server;

augmenting the base map to create the augmented map by generating map data using a processor for executing map creation program code that assigns the at least one provided base segment to an associated position in the provided base map and arranges at least one of the repeating objects derived from the base segment at a position corresponding thereto, such that the augmented map is a map of a previously unmapped surrounding environment, and transmitting at least part of the augmented map to the server, wherein the transportation vehicle establishes a location of the transportation vehicle in the surrounding environment by comparing environment data acquired by at least one sensor on the transportation vehicle with the map data in the augmented map.

2. The method of claim 1, wherein the at least one base segment is parameterized in terms of the at least one characteristic feature.

3. The method of claim 2, wherein the parameterizing of the at least one base segment is based on parameters stored in the base map for a position associated with the at least one base segment.

4. The method of claim 2, wherein the parameterizing includes defining at least one dimension and/or a surface finish of the at least one base segment.

5. The method of claim 1, wherein providing the base map and/or providing the at least one base segment includes retrieving at least some of the base map and/or the at least one base segment from a memory.

6. The method of claim 1, wherein the providing of the least one base segment is performed by a base-segment generator that uses environment data acquired by the at least one sensor to generate and provide the at least one base segment.

7. The method of claim 1, wherein the providing of the base map is performed by a base-map generator that uses the environment data acquired by the at least one sensor to generate and provide at least some of the base map.

8. The method of claim 1, wherein the base segment is indicative of each of a plurality of repeating objects of an indoor car park or a street.

9. The method of claim 8, wherein the repeating objects are car park pillars, parking-space markings, individual houses in a terrace, reflector posts, crash barriers along a road, road markings, windows and entrances to buildings, or lane panels.

10. A device for creating an augmented map for use within a transportation vehicle, the device comprising:

a receiver for receiving, from a server located outside the transportation vehicle that is associated with surrounding environment, at least some of a base map of a surrounding environment of the transportation vehicle and for receiving at least one base segment from the server;

a controller for processing the base map and for processing the at least one base segment, wherein the at least one base segment has at least one characteristic feature and is indicative of each of a plurality of objects having similar or identical characteristic features and repeating in the surrounding environment of the transportation vehicle;

a processor for executing map creation program code that creates the augmented map by generating map data by assigning the at least one provided base segment to an associated position in the provided base map and arranging at least one of the repeating objects derived from the base segment at a position corresponding thereto, such that the augmented map is a map of a previously unmapped surrounding environment; and a transmitter for transmitting at least part of the augmented map to the server, wherein the transportation vehicle establishes its location in the surrounding environment by comparing environment data acquired by at least one sensor on the transportation vehicle with the map data in the augmented map.

11. The device of claim 10, wherein the at least one base segment is parameterized in terms of the at least one characteristic feature.

12. The device of claim 11, wherein the parameterizing of the at least one base segment is based on parameters stored in the base map for a position associated with the at least one base segment.

13. The device of claim 11, wherein the parameterizing includes defining at least one dimension and/or a surface finish of the at least one base segment.

14. The device of claim 10, further comprising a memory, wherein the base map and/or the at least one base segment are provided by retrieving at least some of the base map and/or the at least one base segment from the memory.

15. The device of claim 10, further comprising a base-segment generator that uses environment data acquired by the at least one sensor to generate and provide at least one base segment.

16. The device of claim 10, further comprising a base-map generator that uses environment data acquired by the at least one sensor to generate and provide at least some of the base map.

17. The device of claim 10, wherein the base segment is indicative of each of a plurality of repeating objects of an indoor car park or a street.

18. The device of claim 17, wherein the repeating objects are car park pillars, parking-space markings, individual houses in a terrace, reflector posts, crash barriers along a road, road markings, windows and entrances to buildings, or lane panels.

* * * * *